United States Patent
Ahmed et al.

(10) Patent No.: US 8,126,612 B2
(45) Date of Patent: Feb. 28, 2012

(54) STEERING SYSTEM AND METHOD FOR INDEPENDENT STEERING OF WHEELS

(75) Inventors: A. K. Waizuddin Ahmed, Montréal (CA); Vaibhav Rawat, Maharashtra (IN); Rama B. Bhat, Brossard (CA)

(73) Assignee: Concordia University, Montreal (CA)

( * ) Notice: Subject to any disclaimer, the term of this patent is extended or adjusted under 35 U.S.C. 154(b) by 390 days.

(21) Appl. No.: 12/290,243

(22) Filed: Oct. 27, 2008

(65) Prior Publication Data

US 2010/0106375 A1    Apr. 29, 2010

(51) Int. Cl.
B62D 6/00    (2006.01)

(52) U.S. Cl. .......................................... 701/42; 180/444
(58) Field of Classification Search .................... 701/41, 701/43, 71, 75, 69, 42; 180/444, 421, 447
See application file for complete search history.

(56) References Cited

U.S. PATENT DOCUMENTS

| | | | |
|---|---|---|---|
| 4,423,883 A * | 1/1984 | Wallentowitz et al. | .. 280/93.513 |
| 4,705,130 A | 11/1987 | Fugunaga et al. | |
| 4,767,588 A | 8/1988 | Ito | |
| 4,840,389 A | 6/1989 | Kawabe et al. | |
| 4,967,865 A | 11/1990 | Schindler | |
| 5,001,636 A | 3/1991 | Shiraishi et al. | |
| 5,001,637 A | 3/1991 | Shiraishi et al. | |
| 5,002,142 A | 3/1991 | Klosterhaus | |
| 5,051,908 A * | 9/1991 | Shiraishi | ......................... 701/75 |
| 5,097,917 A | 3/1992 | Serizawa et al. | |
| 5,159,553 A | 10/1992 | Karnopp et al. | |
| 5,230,396 A | 7/1993 | Yasui | |
| 5,247,441 A | 9/1993 | Serizawa et al. | |
| 5,251,135 A | 10/1993 | Serizawa et al. | |
| 5,257,828 A | 11/1993 | Miller et al. | |
| 5,261,503 A | 11/1993 | Yasui | |
| 5,428,536 A | 6/1995 | Ackermann | |
| 5,524,079 A | 6/1996 | Ishida et al. | |
| 5,576,957 A | 11/1996 | Asanuma et al. | |
| 5,615,117 A * | 3/1997 | Serizawa | ......................... 701/42 |
| 5,623,409 A | 4/1997 | Miller | |
| 5,694,319 A | 12/1997 | Suissa et al. | |
| 5,703,775 A | 12/1997 | Yamamoto et al. | |
| 5,774,819 A | 6/1998 | Yamamoto et al. | |
| 5,799,745 A | 9/1998 | Fukatani | |
| 5,845,222 A | 12/1998 | Yasmamoto et al. | |
| 5,925,083 A | 7/1999 | Ackermann | |
| 6,079,513 A | 6/2000 | Nishizaki et al. | |
| 6,108,599 A | 8/2000 | Yamamoto et al. | |
| 6,178,365 B1 | 1/2001 | Kawagoe et al. | |
| 6,179,083 B1 * | 1/2001 | Yamauchi | ..................... 180/444 |
| 6,219,604 B1 | 4/2001 | Dilger et al. | |

(Continued)

Primary Examiner — Thomas Black
Assistant Examiner — Marthe Marc-Coleman
(74) Attorney, Agent, or Firm — Carter & Schnedler, P.A.

(57) ABSTRACT

A steering system comprises a steering wheel adapted to receive a driver's rotational input. Left and right wheel units are rotatable along a steering angle for adjusting a direction of the vehicle during the driving movement. A steering mechanism converts the rotational input to a variation of the steering angle of the wheel units. The steering mechanism comprises a steering shaft connected to the steering wheel, and gear steering units for each said wheel unit. The gear steering units are connected to the steering shaft for mechanically converting the rotational input to steering outputs for both said wheel units to concurrently vary the steering angle of said wheel units. Independent steering units for each wheel unit each adjusting the steering angle of a respective one of the wheel units independently from the rotational input and from the other wheel unit.

11 Claims, 6 Drawing Sheets

U.S. PATENT DOCUMENTS

| | | |
|---|---|---|
| 6,240,350 B1 | 5/2001 | Endo |
| 6,283,483 B1 | 9/2001 | Johnson et al. |
| 6,523,637 B1 | 2/2003 | Nakano et al. |
| 6,637,541 B2 | 10/2003 | Geyer et al. |
| 6,691,009 B1 | 2/2004 | Yao et al. |
| 6,698,542 B2 | 3/2004 | Nishizaki et al. |
| 6,799,104 B2 | 9/2004 | Yao et al. |
| 7,143,684 B2 | 12/2006 | Mattson et al. |
| 7,144,346 B2 | 12/2006 | Hermann et al. |
| 7,255,194 B2 | 8/2007 | Lim et al. |
| 7,274,982 B1 | 9/2007 | Ohkubo et al. |
| 7,308,964 B2 | 12/2007 | Hara et al. |
| 7,325,818 B1 | 2/2008 | Kwon |
| 7,383,917 B2 | 6/2008 | Asano |
| 7,398,854 B2 * | 7/2008 | Heilig et al. .................. 180/446 |
| 2001/0032748 A1 | 10/2001 | Demerly |
| 2002/0070070 A1 | 6/2002 | Andonian et al. |
| 2004/0026158 A1 | 2/2004 | Rieth et al. |
| 2005/0230179 A1 * | 10/2005 | Nakatsu et al. ................ 180/444 |
| 2005/0247510 A1 * | 11/2005 | Asano ........................... 180/421 |
| 2005/0275283 A1 * | 12/2005 | Tsukasaki ..................... 303/140 |
| 2006/0015236 A1 * | 1/2006 | Yamaguchi et al. ............ 701/69 |
| 2006/0095188 A1 | 5/2006 | Post, II |
| 2006/0100766 A1 * | 5/2006 | Schwarz et al. ................ 701/71 |
| 2007/0039775 A1 | 2/2007 | Matsuno et al. |
| 2007/0219690 A1 * | 9/2007 | Ohkubo et al. ................ 701/41 |
| 2007/0246287 A1 * | 10/2007 | Tsukasaki ..................... 180/408 |
| 2008/0059022 A1 * | 3/2008 | Shimodaira et al. ........... 701/36 |
| 2008/0300764 A1 * | 12/2008 | Kato et al. ..................... 701/75 |
| 2009/0319114 A1 * | 12/2009 | Takenaka et al. ............... 701/29 |

* cited by examiner

STEERING SYSTEM AND METHOD FOR INDEPENDENT STEERING OF WHEELS

FIELD OF THE APPLICATION

The present application relates to steering systems and, more particularly, to the independent control of the left and right wheel steer angle.

BACKGROUND OF THE ART

Conventional vehicle steering systems are designed based on a fixed relation between left and right (inner, outer) steer angles to give the best performance at low speeds (close to Ackerman geometry) or can be designed for improved high-speed performance with anti-Ackerman geometry. Due to the fixed relation, the performance cannot be ideal at all speeds. Active steering control has one of the most significant potentials to generate forces to improve handling performance of vehicles at all speeds, where steer angle is actively modified based on driver steering input and vehicle forward speed. Such modification in steer angle with fixed relation between left and right wheels cannot, however, maximize the tire's ability to generate its maximum lateral forces, as it does not consider the tire normal loads which change significantly during maneuvers. In fact, such modification may saturate one tire force while the other tire may still develop more forces.

Analytical studies through computer simulation show that the best handling performance in terms of ideal path, ideal yaw rate, as well as equalization of left and right tires' ability to generate lateral force for a given steering angle at any speed, requires different steering angles for left and right wheels depending on vehicle speed, as well as understeer characteristics of the vehicle. A control algorithm has been developed to show its effectiveness under all conditions. Conventional steering mechanisms use a single degree of freedom (DOF) rack-pinion connected to a 4-bar linkage mechanism for each wheel, following a pro-Ackerman steering ratio between inner and outer wheels. Conventional Active Front Steering (AFS) controls add an active command to this mechanism controlling both front wheels simultaneously.

Ackerman geometry requires the inner wheel to be steered more than the outer wheel, as shown by the following relation:

$$\cot\delta_o - \cot\delta_i = \frac{2T_f}{L} \quad (1)$$

where $\delta_o$ and $\delta_i$ are the outer and inner wheel steering angles, $T_f$ is the half front track width, and L is the wheel base. This geometric ratio is necessary at low speeds to avoid tire scrub. However, at high speeds, higher steering angle results in higher side slip at the inner tire compared to the outer tire. The lateral force generated by a tire primarily depends on two factors: side slip angle and normal load on the tire. During turning, a load shift from the inner wheels to the outer wheels takes place, which can be significant at high speeds. Low normal load on the inner tire not only reduces its ability to generate lateral force, but also decreases the slip angle at which maximum lateral force can be generated. At high speeds, the inner tire's frictional force is prone to reaching saturation due to low normal load and high-slip angle, while the outer tire may still have the ability to generate more lateral force. Hence, the inner tire becomes a deciding factor for the amount of active steering control.

To overcome this situation, anti-Ackerman geometry is employed in race cars, where, the primary concern is higher lateral forces at high-speed turning. The anti-Ackerman geometry requires outer tires to be steered more, hence generating high lateral force from the more capable tire. However, at the same time, the anti-Ackerman geometry causes tire scrub at low speeds, hence introducing noise and tire wear.

Although such steering concepts can be realized by steer-by-wire and wheel actuator systems, their reliability and safety in vehicle applications is always a major concern.

SUMMARY OF THE APPLICATION

It is therefore an aim of the present disclosure to provide a steering system and active independent steering method that address issues associated with the prior art.

Therefore, in accordance with the present application, there is provided a steering system comprising: a steering wheel adapted to receive a driver's rotational input; left and right wheel units adapted to rollingly interface a vehicle to a ground for driving movement of the vehicle, each wheel unit being rotatable along a steering angle for adjusting a direction of the vehicle during the driving movement; a steering mechanism for converting the rotational input to a variation of the steering angle of the wheel units, the steering mechanism comprising a steering shaft connected to the steering wheel, and gear steering units for each said wheel unit, the gear steering units connected to the steering shaft for mechanically converting the rotational input to steering outputs for both said wheel units to concurrently vary the steering angle of said wheel units, and independent steering units for each said wheel unit, the independent steering units each adjusting the steering angle of a respective one of the wheel units independently from the rotational input and from the other wheel unit.

Further in accordance with the present application, there is provided a method for adjusting a steer angle of wheels of a vehicle comprising: measuring a steering input from the driver of the vehicle and a vehicle velocity; calculating a reference yaw rate for the vehicle from the steering input and from the vehicle velocity; measuring an actual yaw rate for the vehicle; determining a corrective value for a first wheel of the vehicle as a function of the reference yaw rate and the actual yaw rate, and of the steering input; adjusting the steer angle of said first wheel by said corrective value.

DESCRIPTION OF THE PREFERRED EMBODIMENTS

Figure 1:
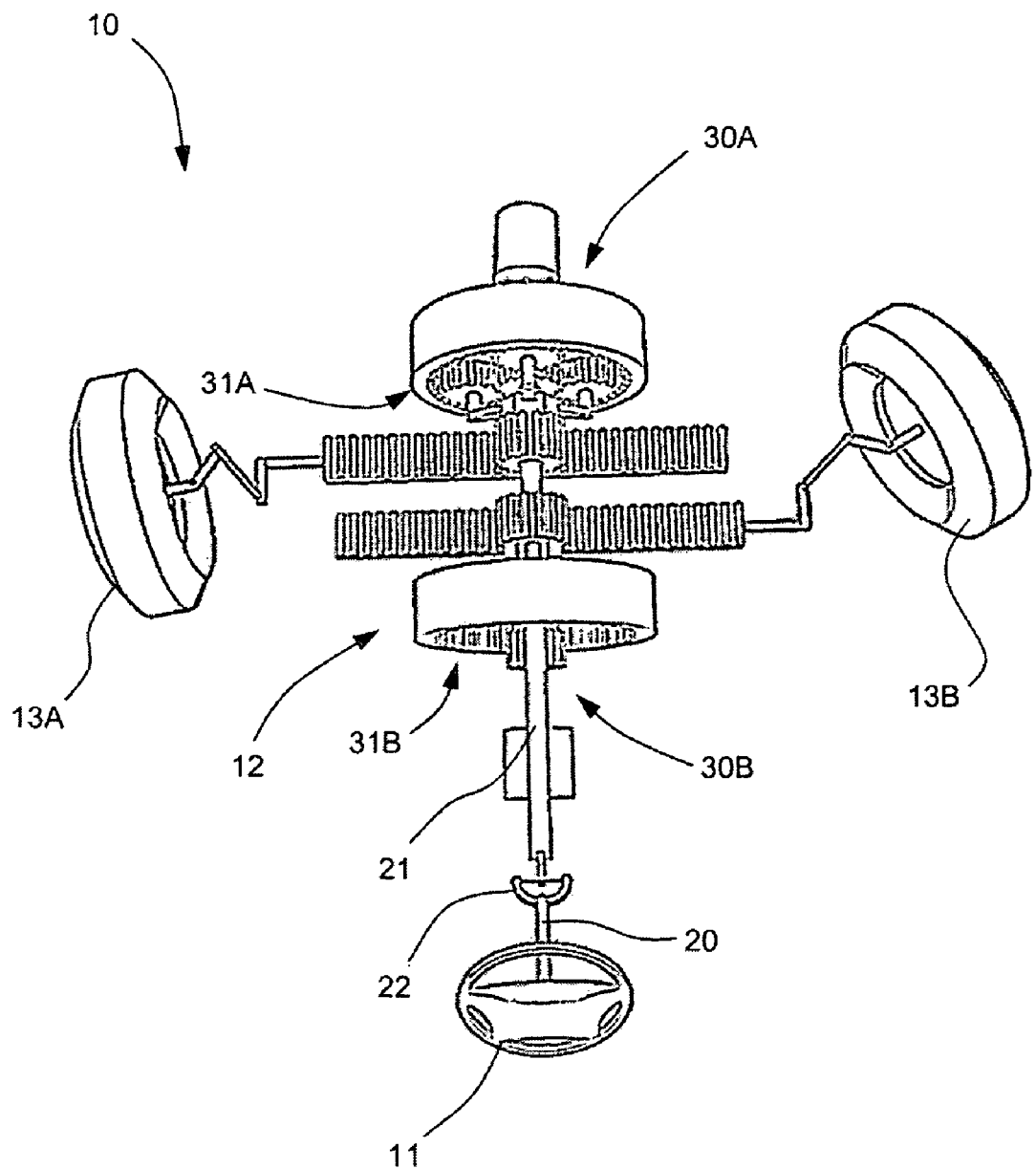
FIG. 1 is a top perspective view of a steering system in accordance with a preferred embodiment of the present application.

Referring to the drawings, and more particularly to FIG. 1, a steering system for independent steering of the wheels is generally shown at 10. The steering system has a steering wheel 11, a steering mechanism 12, and wheels 13, a left wheel 13A and a right wheel 13B. Letters A and B will be affixed to the reference numerals in the drawings and the following description to illustrate the same component, as positioned on the left side (A) or the right side (B) of the vehicle.

The steering wheel 11 is manipulated by the driver to orient the wheels 13 and hence steer a vehicle.

The steering mechanism 12 converts the driver input on the steering wheel 11 to orientation movements of the wheels 13.

The wheels 13 are the interface between the road and the vehicle. The orientation of the wheels 13 along a steer angle is controlled by the steering mechanism 12. In FIGS. 1 to 4, the steering system 10 is illustrated as being a front wheel steering system. However, it is considered to use the steering system of the present application for rear-wheel steering, or for 4-wheel steering as well.

The steering mechanism 12 has a steering shaft including a steering column 20 connecting the steering wheel 11 to a remainder of the steering shaft 21 via a universal joint 22. This is one configuration amongst numerous others used to transfer the driver's rotational input to the wheels 13.

Gear steering units 30A and 30B are both connected to the steering shaft 21. The gear steering units 30A and 30B are respectively associated with the left wheel 13A and right wheel 13B. As the gear steering units 30A and 30B are similar in configuration, a single gear steering unit 30 will be described hereinafter without affixed letters A or B.

Figure 2:
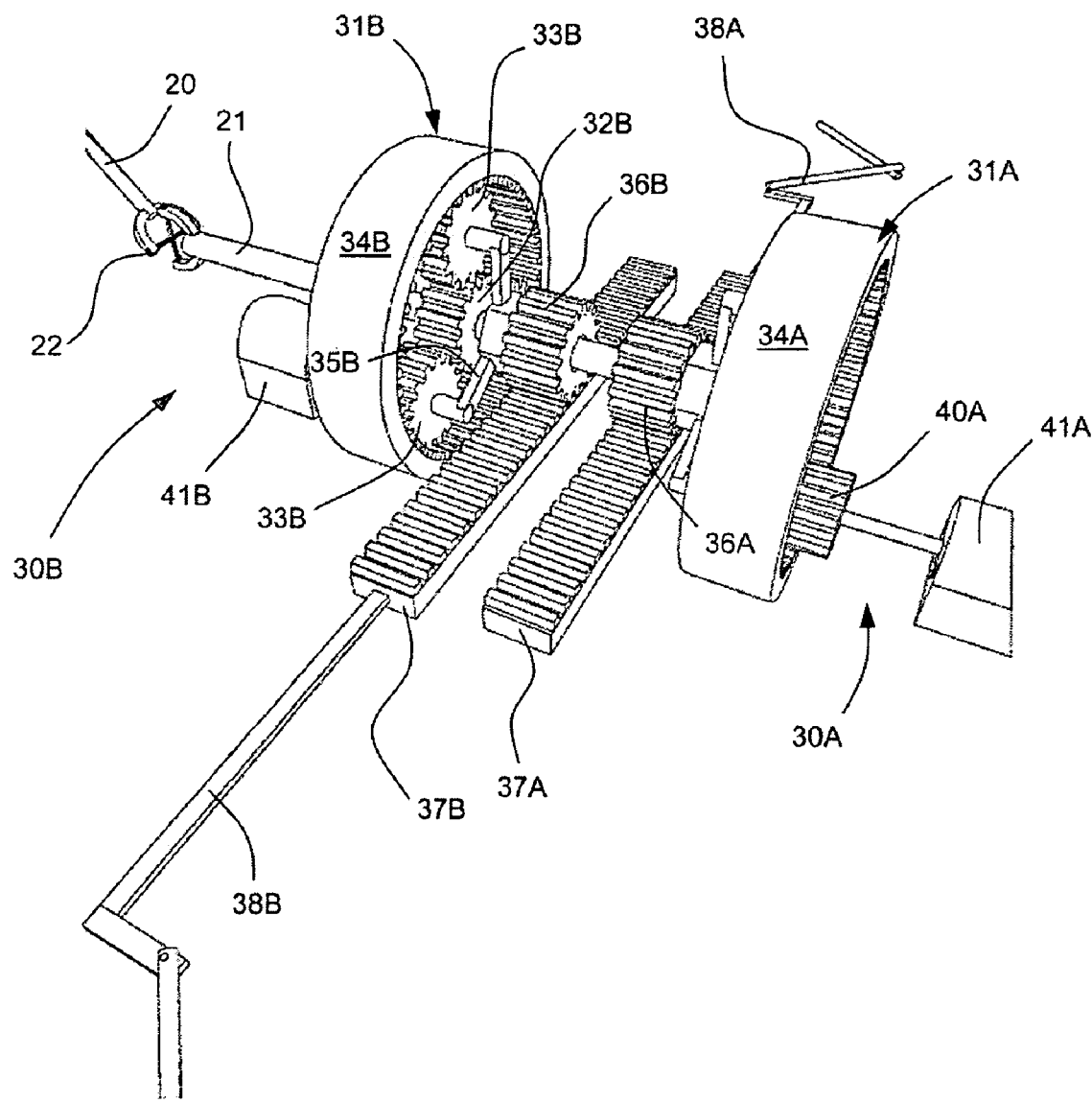
FIG. 2 is a side perspective view of the steering system of FIG. 1.
Figure 3:
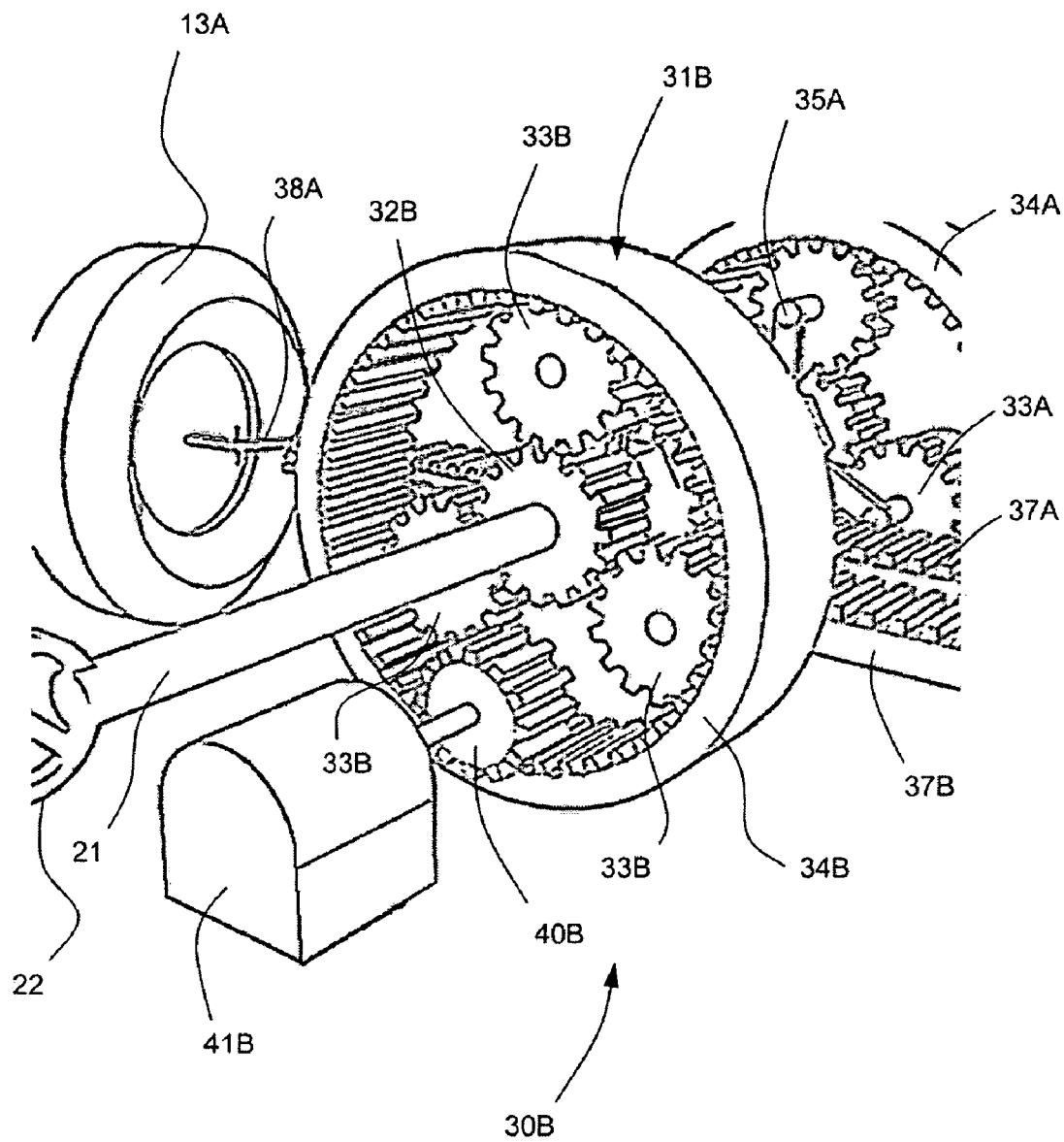
FIG. 3 is an enlarged rear perspective view of a steering unit of the steering system of FIG. 1.
Figure 4:
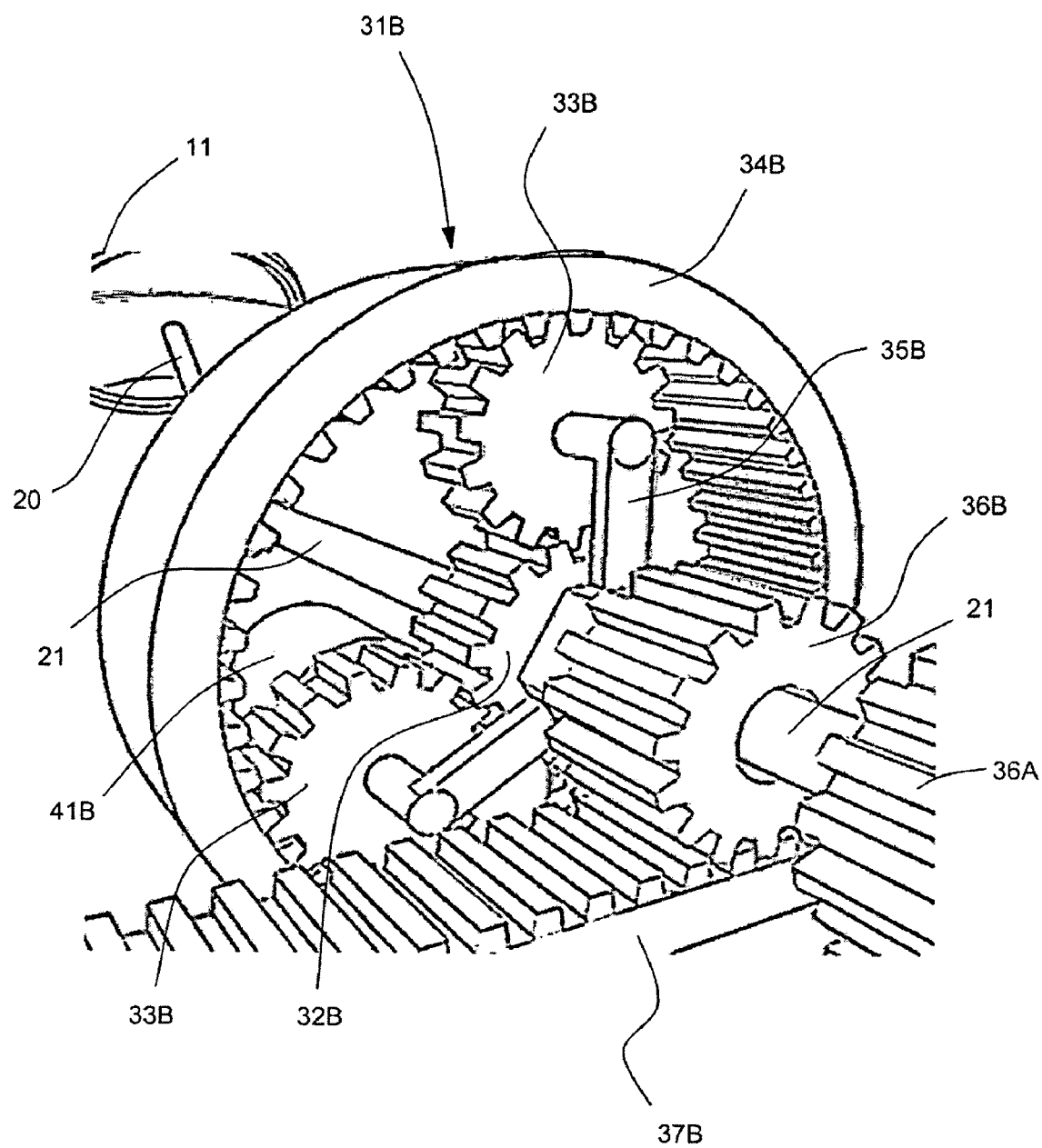
FIG. 4 is an enlarged front perspective view of the steering unit of FIG. 3.

Referring concurrently to FIGS. 2 to 4, gear steering unit 30 has a planetary gear system 31. The planetary gear system 31 has a sun gear 32 fixed to the steering shaft 21 so as to rotate therewith. Three planet gears 33 are in orbit of the sun gear 32 and are meshed therewith, although more or less planet gears 33 could be used as well. However, there must be space between the planet gears 33 for additional gears, as will be described hereinafter. Moreover, the range of movement of the planet gears 33 must take into account the presence of such additional gears.

The planet gears 33 are meshed to an interior of ring 34. The ring 34 is connected to a structure of the vehicle, but rotatable about its own axis, which axis is coincident with that of the sun gear 32 and of the steering shaft 21.

Referring to FIGS. 2 and 4, a planet carrier 35 interconnects the planet gears 33 to pinion 36. The pinion 36 is hollow, so as to accommodate the steering shaft 21 without being secured to it. Accordingly, the steering shaft 21 and the pinion 36 rotate independently from one another, about coincident axes.

The pinion 36 is meshed with rack 37. Accordingly, a rotation of the pinion 36 results in the translation of the rack 37. Linkage 38 interrelates the rack 37 to the wheel 13, whereby a translation of the rack 37 is converted to a rotation of the wheel 13 in its steering angle. The rack 37 and linkage 38 are illustrated schematically in FIGS. 1 to 4 for simplicity purposes. However, it is understood that the rack 37 is provided with an appropriate support for translational movement, and for responding to a rotation of the pinion 36. The linkage 38 is used in combination with various other mechanisms to operatively connect the wheel to the vehicle (e.g., suspension, brake, drive, etc.), and is for instance a four-bar mechanism. The linkage 38 forms part of a wheel unit with wheel 13.

As best seen in FIG. 3, the steering system 10 has independent steering units each having an independent-steer gear 40 meshed with an interior of the ring 34. A rotation of the independent-steer gear 40 is controlled by motor 41. Motor 41 is typically an electric motor connected to a controller unit so as to be actuated in rotating the independent-steer gear 40. An actuation of the independent-steer gear 40 causes rotation of the ring 34.

Gear steering units 30A and 30B are similar to one another and are both connected to the steering shaft 21, whereby a rotation of the steering shaft 21 results in a translation of the same magnitude of both the racks 37A and 37B. In the illustrated embodiment, the steering units 30A and 30B are mirror images of one another.

As the steering wheel 11 is mechanically coupled to the racks 37A and 37B, the wheels 13 of the vehicle may be steered despite failure of the electric system of the vehicle. The driver's input on the steering wheel 11 results in a modification of the steer angle of the wheels 13, with both wheels 13 pivoting to the same steer angle. It is considered to add a power-assist system to provide additional force to a driver's input. However, the steering system 10 as embodied in FIGS. 1 to 4 features a direct mechanical link between the steering wheel 11 and the wheels 13, whether assisted or not.

However, the motors 41A and 41B of the independent steering units are actuated independently from one another by the controller unit of the steering system 10, so as to individually adjust the steering angle of the wheels 13A and 13B.

As shown in FIGS. 1 and 2, the driver input rotates the sun gear 32 of each planetary gear system 31, which rotates the planet gears 33 and the planet carrier 35. As the planet gears 33 rotate about the sun gear 32 as a response to the rotational actuation from the sun gear 32, the planet carrier 35 also rotates about the sun gear 32. As the planet carrier 35 is connected to the pinion 36, a rotation of the planet carrier 35 moves the rack 37, giving the desired steer angle to the wheels 13. The number of teeth for the gears and rack can be selected to obtain a desirable ratio between steering angle input at the steering wheel 11 and the steer angle output at the wheels 13.

When a modification of the steer angle at a wheel 13 is required as determined by the controller unit, the controller motor 41 as shown in FIGS. 2 and 3 will rotate the ring 34 in the appropriate direction via the independent-steer gear 40 to increase or decrease the wheel steer angle. The rotation of the gear 40 will cause a rotation of the ring 34. The rotation of the ring 34 will result in a rotation of the planet gears 33 and of the planet carrier 35 about the sun gear 32, without causing a rotation of the sun gear 32 itself. This is achieved without altering the motion of the sun gear 32 or the steering shaft 21 attached to it. Controller motors 41A and 41B can be activated independently to modify the steer angle of each wheel 13 to the level determined by the controller unit.

It is pointed out that numerous other configurations are considered for the steering system 10. For instance, the independent steering units may act directly on the wheels 13, or on the racks 37. Moreover, other mechanisms may be used as alternatives to the planetary gear systems 31 to convert the rotational movement from the steering shaft 21 to a steering output for the wheels 13.

For a desired maneuver, the driver will give a standard steering command by turning the steering wheel. The controller motors 41 being stationary, the system will work as conventional systems. The vehicle response to the steering input will be sensed to calculate the error in the yaw rate and/or other responses compared to the ideal for the forward speed and steering command. The control algorithm proposed based on speed, steering input, as well as understeer characteristics of the vehicle, will decide the steer angle for which wheel should be increased or decreased. In this decision, the wheel load shift due to the maneuver and the resulting vertical load at wheel is also taken into account since it affects the tire's ability to generate force. The controller unit therefore decides which tire's steer angle should be increased or decreased to realize the ideal response, while one tire's lateral force must not saturate before the other. The controller unit will, therefore, send the appropriate signal to the motor 41A and/or motor 41B for appropriate modification of the wheel steer angle. The modification can be done by adding or subtracting steer angle independently at each wheel from the one given by driver command. This modification is done by rotating the rings 34 and thus will not affect the steering column 22 or the driver's input. The modification will be done without the knowledge of the driver.

Figure 6:
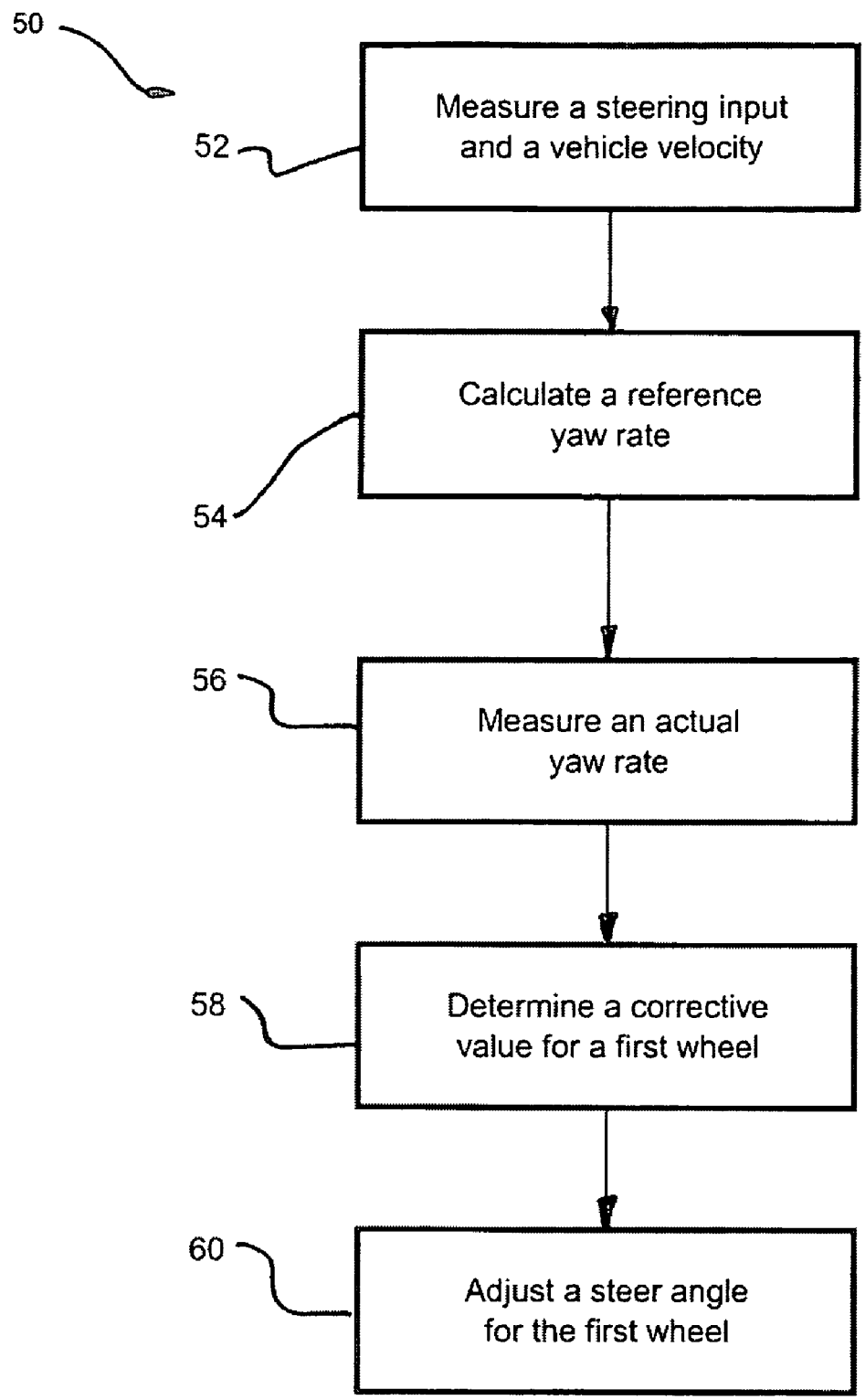
FIG. 6 is a flow chart illustrating a method for adjusting a steering angle according to another preferred embodiment of the present application.

In order to achieve improved steering and handling performance at low and high speeds, it is considered to use steering system 10 with independent control for both front wheels. Accordingly, a method is illustrated at 50 in FIG. 6 for the controller unit to adjust the steer angle of the wheels. The controller unit would make it possible to follow an Ackerman ratio at low speeds, while using an anti-Ackerman ratio at high speeds. Conventional AFS techniques risk saturation of the inner tire forces, while Active Independent Front Steering (AIFS) control utilizes the tire frictional forces, in an attempt to equalize the tire workload between the two front tires. Tire workload is a measure of utilization of the tire's frictional forces, and is defined as the ratio of total forces being generated from the tire and the maximum ability to generate forces at instantaneous normal load. For simplicity purposes, tire longitudinal forces are neglected and both tires are assumed to have similar lateral stiffness characteristics and road conditions. Hence, tire workload is simplified as the ratio of the lateral force to the normal load:

$$\text{Tire workload} = \frac{F_y}{F_z} \quad (2)$$

In order to achieve an ideal state of a response, active feedback control is employed in the vehicle. The controller unit changes one of the input parameters to achieve one of the reference or set-point state parameters. A conventional AFS controller unit may be based on a simple feedback proportional-integral (PI) control strategy. A conventional controller unit controls steering angle of both front wheels 13 simultaneously following a near Ackerman ratio between inner and outer wheels. According to step 52, the controller unit measures the steering input from the driver of the vehicle, for instance by a magnitude sensor on the steering wheel 11, as well as the vehicle velocity. Then, according to step 54, the controller unit calculates the reference yaw rate from forward velocity and the driver steering input command as shown in equation (3) below. According to steps 56 and 58, the response can be used to define an error or corrective value in the yaw rate as:

$$R_{ref} = \frac{L}{\tan(\delta_{st})} \quad (3)$$

$$\Omega_{ref} = \frac{V_x}{R_{ref}} = \frac{V_x \cdot \tan(\delta_{st})}{L} \quad (4)$$

$$\Delta\Omega = \Omega_{ref} - \Omega_{act} \quad (5)$$

In equations (3) to (5), $R_{ref}$ is the ideal radius of curvature for wheel steer angle $\delta_{st}$ for a vehicle with a wheel base L. $\Omega_{ref}$ is thus the ideal yaw rate for a forward velocity $V_x$. In equation (5), the error in yaw rate is the difference between $\Omega_{ref}$ and the actual yaw rate $\Omega_{act}$ of the vehicle measured with a yaw rate sensor in step 56.

To minimize this error, an actively controlled additional steering command has to be added to the driver input. The input of active steering command is proportional to the error in the yaw rate. The steer gain factor $K_{st}$ can be defined as:

$$K_{st} = \frac{\delta_{st}}{\Omega_{ref}} = \frac{\delta_{st} \cdot L}{V_x \tan(\delta_{st})} \approx \frac{L}{V_x} \quad (6)$$

The corrective steering angle can be calculated in step 58 from the gain factor and the yaw rate error as:

$$\Delta\delta_{st} = K_{st} \cdot \Delta\Omega \quad (7)$$

and the actively controlled steering command with PI controller unit can finally be calculated as:

$$\delta_c = k_1 \Delta\delta_{st} + k_2 \int \Delta\delta_{st} \quad (8)$$

In equation (8), $\delta_c$ is the corrective steering command required to realize the reference yaw rate and $\Delta\delta_{st}$ is established in equation (7). The first and second terms on the right-hand side of equation (8) represent the proportional and integral part of the feedback controller, and $k_1$ and $k_2$ are the weight assigned to proportional and integral parts. These weights can be adjusted to realize the best performance of the controller. According to step 60, the steer angle is corrected, for instance, using the steering system 10 described in FIGS. 1 to 4.

Figure 5:
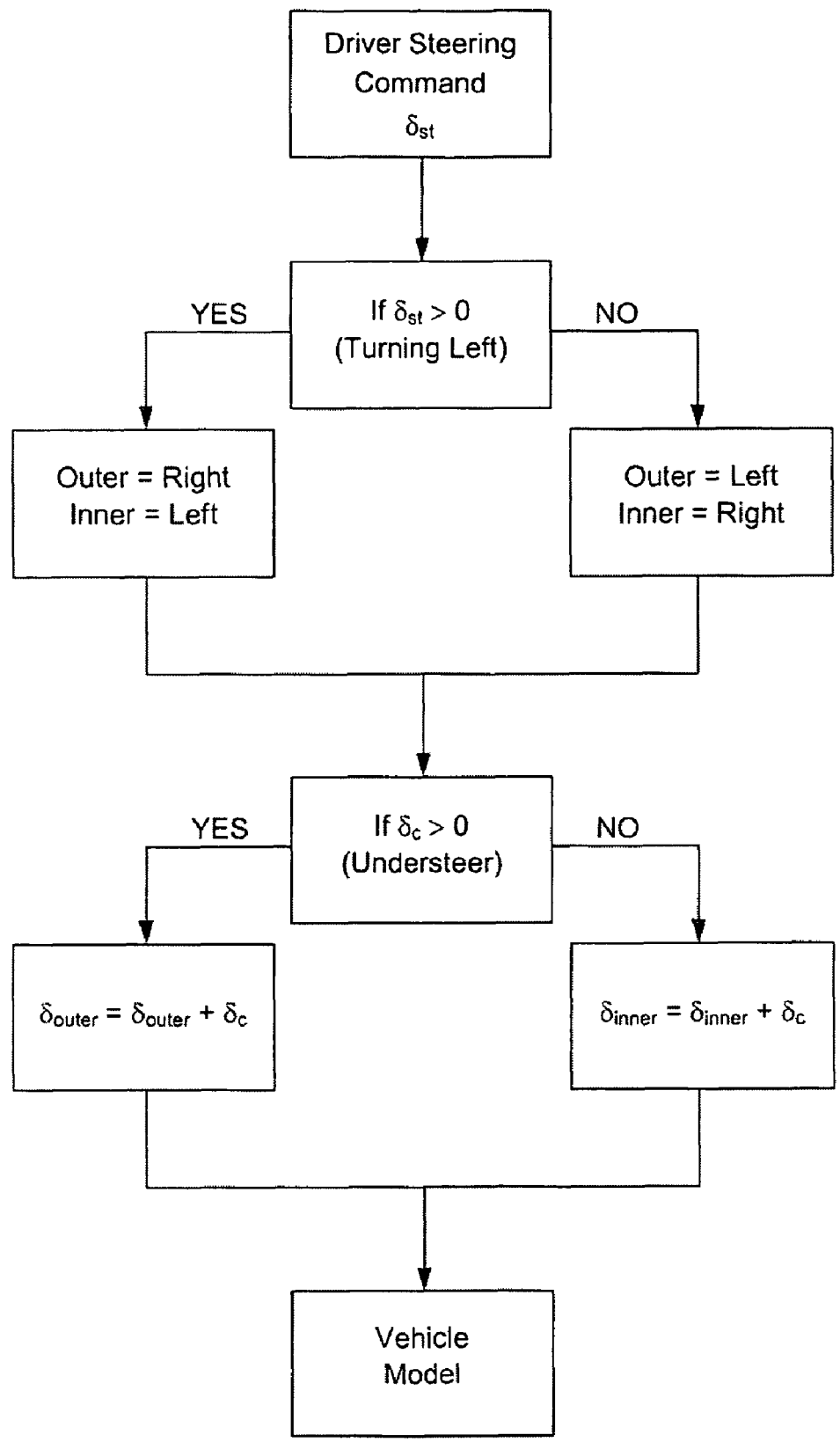
FIG. 5 is a block diagram showing a method used by a controller unit for active independent steering of wheels of a vehicle.

For commonly designed understeer vehicles and for any steering command by the driver, the AIFS will first identify the instantaneous outer wheel and the corrective steering angle required at that forward speed according to equations (4) to (8) for the outer wheel. The corrective angle will then be added to the outer wheel only, thus introducing anti-Ackerman geometry. In doing so, a larger force is developed at the more capable outer wheel to realize the reference yaw rate while the tire work load of the inner and outer wheels are brought closer. The control strategy is shown in FIG. 5. The conventional AFS on the other hand increases the tire work load of both tires risking the saturation of the inner tire.

If the vehicle characteristic is oversteer, as shown in FIG. 5, the inner wheel is identified and the corrective steer angle is subtracted from the inner wheel angle to realize the reference yaw rate. For this oversteer case, however, the tire work load is not equalized. In order to equalize tire work load of an oversteer vehicle both wheels need to be controlled. For an AIFS to operate on both front wheels simultaneously, it is suggested to distribute the active command on both wheels, by controlling the previously uncontrolled wheel in proportion to the controlled wheel. For an example, a control scheme represented in equation (9) can be used:

$$\delta_i = \delta_{st} + \delta_c$$

$$\delta_o = \delta_{st} + 0.4\delta_c \quad (9)$$

Due to the oversteer nature, the inner wheel is considered as the controlled wheel and only 40% of the controller command is added to the outer wheel. The distributed AIFS is able to equalize the tire workload better than the conventional AFS control. Although conventional AFS reduces the tire workload for both front tires compared to non-control vehicle, it is incapable of equalizing them. The understeer characteristic of the vehicle can also be detected from the sign of either the yaw rate error or the corrective angle ($\delta_c$), as shown in FIG. 5.

The system will enhance the handling performance and stability of the vehicle. In addition, the system can be used to introduce a steer angle at a selected wheel without any driver input for enhancement of stability, with or without other stability enhancement techniques. In case of failure, the controller motors will be locked in place and the system will work as a conventional system, and is thus failsafe. Any power-steering system applicable to conventional system can be used with modification to realize power steering with the proposed design. It is pointed out that the intervention of the controller motors is within saturation limits, in order to avoid outputting steering angle beyond acceptable values.

This application presents via an embodiment a mechanical system consisting of tandem planetary gear with separate racks for each wheel that can be designed to give the best ratio between inner and outer wheel steer angle at low speed, while each wheel steer angle can be modified independently by motors depending on the controller command. Any modification to wheel steer angle will not be felt by the driver through the steering wheel under the driver's control. In other words, the driver can give same steering angle for a maneuver at any speed and, if the predefined path for that steering angle is not followed at any other speed, the controller unit through the developed steering mechanism will modify the left only, right only or both wheel steer angles without any knowledge of the driver. In doing so, the vehicle will follow the ideal path and ideal yaw rate while ensuring that the wheel that can generate more force is only modified. The mechanism will allow for such control while remaining failsafe. In the event of failure in the control system and/or motors, the system will behave like an uncontrolled conventional steering system.

The proposed control strategy design of the mechanism will provide the best possible handling performance of the vehicle, reducing the skill requirement of the driver. It also has potential for further development, mainly through controller unit for automatic parking, maximizing performance on split-mu surface, to provide variable steering ratio, and can be combined with other control systems such as control through tire traction and braking force generation. The independently controllable steering system can revolutionize the stability enhancement techniques for a vehicle through introduction of lateral force at a selected wheel, as well as integrated control strategies. The above is possible since a steer angle at a selected wheel can be introduced without intervention of the driver.

The adaptive control strategy and the mechanism for independent control of steered wheel presented is also applicable to rear wheel and/or 4-wheel steering system.

The invention climed is:

1. A steering system comprising:
   a steering wheel adapted to receive a driver's rotational input;
   left and right wheel units adapted to rollingly interface a vehicle to a ground for driving movement of the vehicle, each wheel unit being rotatable along a steering angle for adjusting a direction of the vehicle during the driving movement;
   a steering mechanism for converting the rotational input to a variation of the steering angle of the wheel units, the steering mechanism comprising:
   a steering shaft connected to the steering wheel,
   gear steering units for each said wheel unit, the gear steering units connected to the steering shaft and each comprising a planetary gear system for receiving the rotational input from the steering shaft and for mechanically converting the rotational input to steering outputs for both said wheel units to concurrently vary the steering angle of said wheel units, and
   independent steering units for each said wheel unit, the independent steering units each adjusting the steering angle of a respective one of the wheel units independently from the rotational input and from the other wheel unit by directly actuating a rotation of a ring of the planetary gear system.

2. The steering system according to claim 1, wherein the gear steering units each comprise a rack and pinion assembly connected to the planetary gear system for transmitting the steering output to a respective wheel unit in a translational degree of freedom.

3. The steering system according to claim 2, wherein a sun gear of the planetary gear system is secured to the steering shaft, and a pinion of the rack and pinion assembly is secured to a planet carrier of the planetary gear system.

4. The steering system according to claim 3, wherein the steering shaft, the sun gears and the pinions rotate about a coincident axis.

5. The steering system according to claim 2, wherein the independent steering units each have an electric motor outputting rotational motion to an independent-steer gear, with the independent-steer gear being meshed with the ring of the respective planetary gear system to adjust the steering angle of the respective wheel unit.

6. The steering system according to claim 2, wherein the planetary gear systems are symmetrically similar.

7. A method for adjusting a steer angle of wheels of a vehicle comprising:
   measuring a steering input from the driver of the vehicle and a vehicle velocity;
   calculating a reference yaw rate for the vehicle from the steering input and from the vehicle velocity;
   measuring an actual yaw rate for the vehicle;
   determining a corrective value for a first wheel of the vehicle as a function of the reference yaw rate and the actual yaw rate, and of the steering input;
   adjusting the steer angle of said first wheel by said corrective value, independently of an adjustment of steer angle of any other wheel of the vehicle.

8. The method according to claim 7, wherein determining a corrective value comprises determining a corrective value for at least a second wheel, and adjusting the steer angle comprises adjusting the steer angle of said first wheel and said second wheel independently from one another.

9. The method according to claim 7, wherein adjusting the steer angle comprises actuating an electric motor to mechanically adjust the steer angle of said first wheel.

10. The method according to claim 7, wherein determining a corrective value comprises identifying said first wheel from a direction of said steering input and from an understeer/oversteer characteristic of the vehicle.

11. The method according to claim 10, wherein identifying said first wheel comprises identifying the outer wheel as said first wheel for an understeer characteristic for the vehicle.

* * * * *